(12) United States Patent  (10) Patent No.: US 7,908,067 B2
Soliman et al.  (45) Date of Patent: *Mar. 15, 2011

(54) HYBRID ELECTRIC VEHICLE BRAKING DOWNSHIFT CONTROL

(75) Inventors: Ihab S. Soliman, Warren, MI (US); Andrew John Silveri, Royal Oak, MI (US); Deepak Aswani, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 477 days.

This patent is subject to a terminal disclaimer.

(21) Appl. No.: 11/950,731

(22) Filed: Dec. 5, 2007

(65) Prior Publication Data

US 2009/0150035 A1    Jun. 11, 2009

(51) Int. Cl.
*G06F 19/00* (2006.01)

(52) U.S. Cl. ........ 701/54; 701/22; 180/65.1; 180/65.265; 180/65.7; 903/915

(58) Field of Classification Search .................... 701/22, 701/54; 180/65.1, 65.25, 65.265, 65.7; 477/5; 903/903, 909, 915
See application file for complete search history.

(56) References Cited

U.S. PATENT DOCUMENTS

| | | | |
|---|---|---|---|
| 6,164,400 A | 12/2000 | Jankovic et al. |
| 6,459,980 B1 | 10/2002 | Tabata et al. |
| 6,506,139 B2 | 1/2003 | Hirt et al. |
| 6,512,967 B2 | 1/2003 | Osterberg et al. |
| 6,617,703 B2 | 9/2003 | Matsubara et al. |
| 6,637,178 B1 | 10/2003 | Cook et al. |
| 6,775,601 B2 | 8/2004 | MacBain |
| 6,827,167 B2 | 12/2004 | Cikanek et al. |
| 6,835,160 B2 | 12/2004 | Kitano et al. |
| 6,837,323 B2 | 1/2005 | Denton et al. |
| 6,853,893 B2 | 2/2005 | Corcione et al. |
| 6,862,511 B1 | 3/2005 | Phillips et al. |
| 6,890,283 B2 | 5/2005 | Aoki |
| 6,907,337 B2 | 6/2005 | Phillips et al. |
| 6,910,329 B2 | 6/2005 | Bunting et al. |
| 6,915,198 B2 | 7/2005 | Phillips et al. |
| 6,941,830 B2 | 9/2005 | Ibamoto et al. |
| 6,988,976 B2 | 1/2006 | Potter |
| 6,991,053 B2 | 1/2006 | Kuang et al. |
| 6,994,360 B2 | 2/2006 | Kuang et al. |
| 7,010,406 B2 | 3/2006 | Sah et al. |
| 7,071,642 B2 | 7/2006 | Wilton et al. |
| 7,086,301 B2 | 8/2006 | Sakamoto et al. |
| 7,131,708 B2 | 11/2006 | Tao et al. |
| 7,151,987 B2 | 12/2006 | Tobler et al. |
| 2001/0044683 A1 | 11/2001 | Takaoka et al. |
| 2004/0014565 A1 | 1/2004 | Oshima et al. |
| 2004/0034460 A1 | 2/2004 | Folkerts et al. |
| 2004/0129470 A1 | 7/2004 | Huelser et al. |
| 2005/0003928 A1 | 1/2005 | Niki et al. |

(Continued)

OTHER PUBLICATIONS

U.S. Appl. No. 11/766,055, filed Jun. 20, 2007, Soliman et al.

(Continued)

*Primary Examiner* — Gertrude Arthur Jeanglaud
(74) *Attorney, Agent, or Firm* — David B. Kelley; Alleman Hall McCoy Russell & Tuttle LLP

(57) ABSTRACT

A hybrid propulsion system for a vehicle is disclosed. In one embodiment an energy conversion device compensates for transmission shifting. The system can improve transmission shifting during at least some conditions.

21 Claims, 6 Drawing Sheets

U.S. PATENT DOCUMENTS

| | | |
|---|---|---|
| 2005/0009665 A1* | 1/2005 | Cho .................................. 477/5 |
| 2005/0060079 A1 | 3/2005 | Phillips et al. |
| 2005/0064987 A1 | 3/2005 | Budal et al. |
| 2005/0164827 A1* | 7/2005 | Beaty et al. ....................... 477/3 |
| 2005/0228553 A1 | 10/2005 | Tryon |
| 2006/0064225 A1 | 3/2006 | Tabata et al. |
| 2006/0070779 A1 | 4/2006 | Kuang |
| 2007/0205735 A1* | 9/2007 | Kiuchi et al. ................. 318/432 |

OTHER PUBLICATIONS

U.S. Appl. No. 11/766,056, filed Jun. 20, 2007, Soliman et al.

"Land Rover Reveals 'Land_E', Technology Concept for Cleaner Environment, Improved Fuel Economy." Mar. 16, 2006. <http://www/asiapmews.com/automotive/land-rover-reveals-land-e-technology-concept-for-cleaner.html>.

* cited by examiner

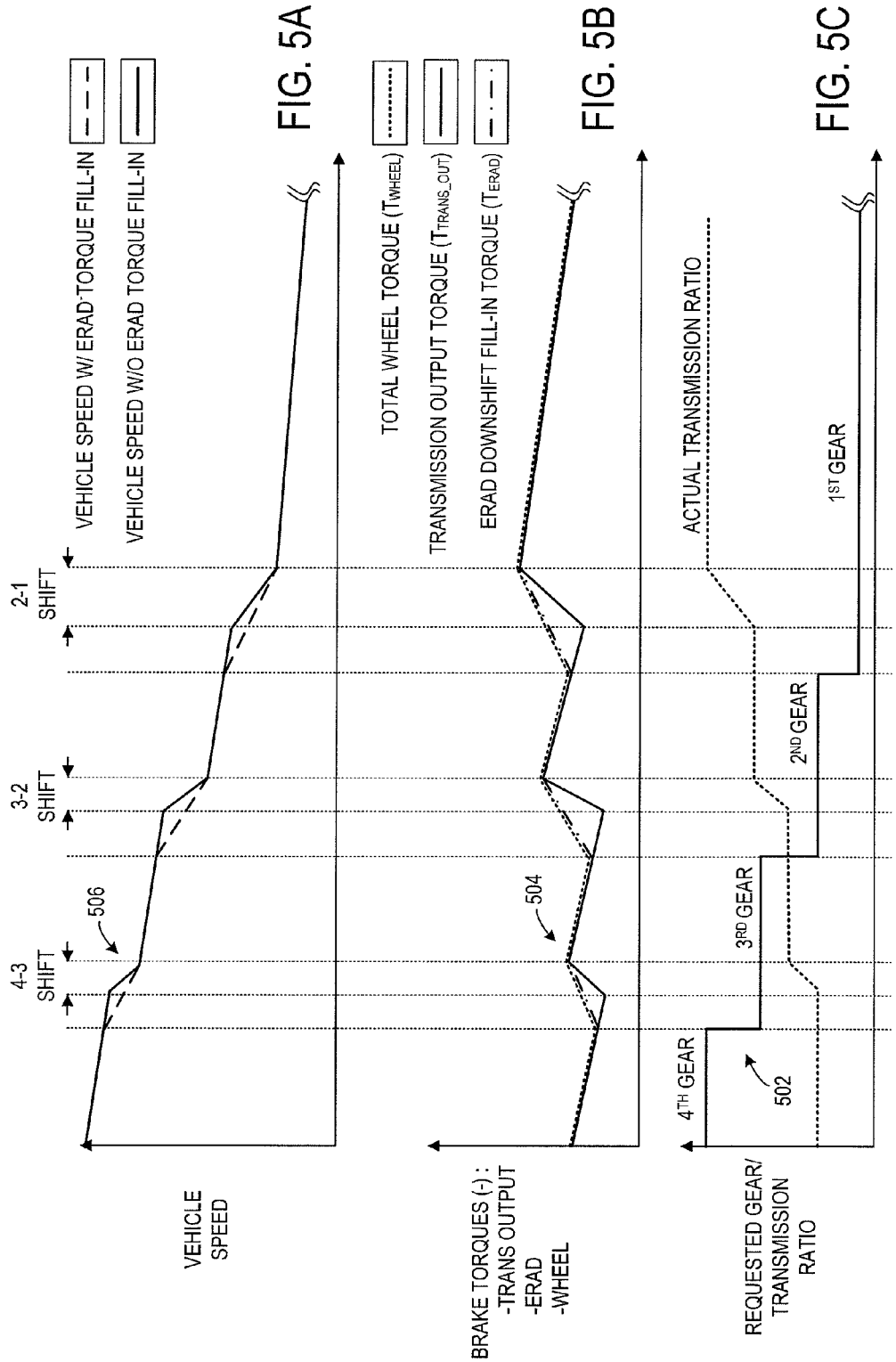

HYBRID ELECTRIC VEHICLE BRAKING DOWNSHIFT CONTROL

BACKGROUND AND SUMMARY

Vehicles may be configured with a hybrid propulsion system that utilizes at least two different sources of torque for propelling the vehicle. As one non-limiting example, a hybrid propulsion system for a vehicle may be configured as a hybrid electric vehicle (HEV), wherein one or more electric machines and an internal combustion engine may be selectively operated to provide the requested propulsive effort. Similarly, during deceleration of the vehicle, the electric machines and engine can be selectively operated to provide vehicle driveline braking in order to recapture kinetic energy of the vehicle. In particular, the electric machines can be used to absorb torque that may be converted into electric energy which may be stored in a battery in what may be referred to as regenerative braking. In this way, vehicle efficiency may be increased.

Furthermore, a hybrid propulsion system may include a fixed ratio transmission to transmit torque from the various torque sources to the wheels. A fixed-ratio transmission may have less complexity and reduced cost as compared to a continuously variable transmission. In this way, vehicle complexity and cost may be reduced In one approach, to extend regenerative braking conditions during deceleration of a vehicle, a state of a fixed-gear transmission may be shifted to a lower gear ratio. By downshifting the transmission, limitations of the energy storage device, engine speed constraints, and/or braking limitations of the electric machines may be avoided.

However, the inventors of the present disclosure have recognized a disadvantage with the above approach. In particular, with a fixed-ratio transmission, the driver can experience driveline disturbances due to abrupt changes in the engine brake torque when a transmission downshift occurs. This can happen during conditions in which engine compression braking is desired in order to decelerate the vehicle. Furthermore, when descending a downhill grade in order to limit the vehicle speed, abrupt driveline torque disturbances can be felt by the driver during engine braking downshifts.

In at least one approach described herein, at least some of the above issues may be addressed by a hybrid propulsion system for a vehicle. The hybrid propulsion system including a multiple step fixed-ratio transmission device for transmitting torque to a first at least one drive wheel, a first electric energy conversion device coupled to an input of the multiple-step fixed-ratio transmission device, a second electric energy conversion device for transmitting torque to a second at least one drive wheel, and a control system, during a vehicle deceleration condition in which the transmission is downshifted, the control system increasing negative torque output of at least one of the first electric energy conversion device and the second electric energy conversion device to meet a desired wheel braking torque in response to the fixed-ratio transmission transitioning from a first gear ratio to a second gear that is lower than the first gear ratio. By increasing the negative torque of the electric energy conversion devices of the hybrid vehicle during an engine braking transmission downshift event, brake torque at the wheels may be increased over a longer period which may result in a smooth torque transmission. In this way, driveline disturbances may be reduced and vehicle drivability may be improved. In other words, by taking advantage of the electric energy conversion devices regenerative braking capabilities, smooth driveline braking can be provided during engine braking transmission downshift events.

BRIEF DESCRIPTION OF THE DRAWINGS

FIG. 5A-5C graphically depict an example of engine braking downshift control using an electric rear axle device.

DETAILED DESCRIPTION

Figure 1:
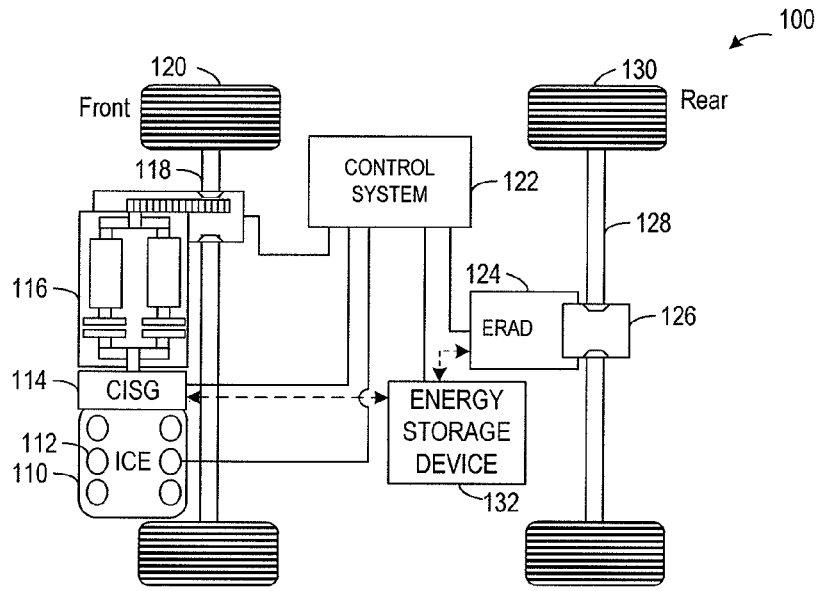
FIG. 1 shows an example hybrid vehicle propulsion system.

FIG. 1 illustrates an example hybrid propulsion system 100 for a vehicle. In this particular example, hybrid propulsion system 100 is configured as a hybrid electric vehicle (HEV), which may be operated in conjunction with a front wheel drive (FWD) vehicle platform. However, the approaches described herein may be applied to other vehicle platforms including rear wheel drive, four wheel drive, or all wheel drive systems. Hybrid propulsion system 100 includes a powertrain comprising an internal combustion engine (ICE) 110, a first electric energy conversion device 114, a transmission 116 for providing torque to front wheels 120, and a second electric energy conversion device 124 for providing torque rear wheels 130.

The first and second electric energy conversion devices may be alternatively referred to as motors and/or generators. It will be appreciated that an electric energy conversion device may be any suitable device for converting electric energy to kinetic energy and/or kinetic energy to electric energy.

Engine 110 may include one or more combustion chambers or cylinders 112 for combusting a fuel. As one non-limiting example, engine 110 may be operated in what may be referred to as an Atkinson cycle. The engine may be operated in an Atkinson cycle to achieve improved fuel efficiency over similarly sized Otto cycle engines, whereby the electric motors may be operated to assist the engine to provide requested driveline torque, for example, during acceleration of the vehicle. However, in other examples, engine 110 may be operated in an Otto cycle or other suitable combustion cycle. It will be appreciated that during different modes of operation the engine may discontinue combustion of fuel in some or all of the cylinders. In this way, fuel efficiency may be increased. In some embodiments, engine 110 may be a diesel engine, such as for example an inline five cylinder diesel engine.

First motor 114 may be coupled to an output shaft of engine 110. In some embodiments, the first motor may be in operative communication with the engine via a gear configuration. As one non-limiting example, first motor 114 may be configured as what may be referred to as a crankshaft integrated starter/generator (CISG) system. During startup of the hybrid propulsion system, the CISG may provide torque to turn the engine to facilitate startup of the engine. Under some conditions, the CISG may supply torque output to supplement or replace engine torque. Further, under some conditions, the CISG may supply negative torque output that may be converted into electric energy.

Engine 110 and/or first motor 114 may transmit torque to an input of transmission 116. Transmission 116 may transmit torque to front wheels 120 via front axle (or final drive) 118. Transmission 130 may include two or more selectable gear ratios that can be used to vary the ratio of speed and/or torque that is exchanged between the transmission input (i.e. the engine/CISG) and the transmission output (i.e. final drive/front wheels). As one non-limiting example, transmission 116 may include six selectable gears, however, other transmissions having more or less gears may be used. Further, transmission 116 may be configured as a dual-clutch (i.e. powershift) or automatically shifted manual transmission both of which do not use a torque converter. In alternative embodiments, transmission 116 may include a torque converter comprising an impeller and a turbine. The transmission may be engaged or disengaged by varying a state of the torque converter to vary the torque transfer between the impeller and the turbine.

It will be appreciated that first motor 114 may be configured in a motor system that includes any suitable gearing to enable first motor 114 to be selectively operated independent from engine 110. For example a clutch may be used to provide an operative disconnect in between the CISG system and the engine to reduce frictional torque losses from the engine while the CISG system is used to generate electrical energy.

Continuing with FIG. 1, second electric energy conversion device 124 may be communication in communication with rear axle 128 and rear wheels 130 via gear configuration (or final drive) 126. In some embodiments, second electric energy conversion device (or motor) 124 may be configured as what may be referred to as an electric rear axle device (ERAD) system. The ERAD system may include any suitable gearing to enable the second motor to provide torque output to the rear wheels. For example, gear configuration 126 may include a planetary gear set comprising a carrier (C), a sun gear (S), and a ring gear (R). By varying a state of the planetary gear set, an amount of torque exchanged between second motor 124 and final shaft 128 may be varied. In this way, second motor 124 may selectively supply or absorb torque to drive shaft 128 and rear wheels 130. In alternative embodiments, second motor 124 may be coupled directly to final drive 128.

CISG system 114 and ERAD system 124 may be operated to exchange torque with drive shafts 118 and 128, respectively. For example, CISG system 114 can be operated to supply torque to drive shaft 118 in response to electrical energy received from energy storage device 132. Similarly, ERAD system 124 can be operated to supply torque to drive shaft 128 in response to electrical energy received from energy storage device 132. In this manner, the CISG and/or ERAD can be operated to assist the engine to propel the vehicle or to propel the vehicle without operation of the engine.

Furthermore, CISG system 114 and/or ERAD system 124 can be selectively operated to absorb torque from drive shafts 118 and 128, respectively, whereby the energy may be stored at energy storage device 132 or exchanged between CISG system 114 and ERAD system 124. For example, electrical energy generated by the ERAD can be supplied to the CISG to rotate engine 110 as means of dissipating energy. Energy storage system 132 may include one or more batteries, capacitors, or other suitable energy storage devices. It will be appreciated that each of front wheel 120 and rear wheels 130 may include a friction brake to provide supplemental braking for deceleration of the vehicle.

A control system 122 may be communicatively coupled to some or all of the various components of hybrid propulsions system 100. For example, control system 122 can receive operating condition information from engine 110 such as engine speed, CISG system 114, transmission 116 including the current gear selected, transmission turbine and drive shaft speeds, torque converter state, ERAD 124, energy storage device 132 including state of charge (SOC) and charge rate, wheels 120 and 130 including vehicle speed, and the position of the friction brakes. In some embodiments the control system may receive a user input via a user input device. For example, the control system may receive a vehicle braking request from a user via a pedal as detected by pedal position or pressure sensor. Moreover, the control system may receive a vehicle (& engine) braking request from a user such as low range selection via the shift selector. In some embodiments, the control system may identify the angle of inclination or grade of the road surface via an inclinometer or other suitable device.

Further, control system 122 can send control signals to engine 110 to control fuel delivery amount and timing, spark timing, valve timing, throttle position, among other engine operating parameters, CISG 114 to control the amount of torque exchanged with transmission 116 and/or engine 110, transmission 116 to change gear selection and to control the state of the torque converter or clutch(s), ERAD 124 to control the amount of torque exchanged with driveshaft 128, energy storage device 132 to control the amount of energy received from or supplied to the ERAD and CISG systems, and the friction brakes to vary an amount of braking force applied at the wheels 120 and 130 as will be described in greater detail herein. It will be appreciated by one of skill in the art in light of the present disclosure that the control system may adjust operating parameters of the various driveline components via electro-mechanical or electro-hydraulic actuators, or other suitable device.

Control system 122 may include one or more microcomputers, including a microprocessor unit, input/output ports, an electronic storage medium for executable programs and calibration values configured as read only memory chip, random access memory, and/or keep alive memory, and a data bus. Thus, it will be appreciated that control system 122 can execute the various control routines described herein in order to control the operation of hybrid propulsion system 100. In one example, to achieve optimum negative driveline torque control during a braking operation, the control system may be configured to increase and/or maximize energy recovery while reducing and/or minimizing engine braking by utilizing the regenerative braking capability of the electric machines within the energy storage capacity and power exchange limitations of the energy storage device.

In some embodiments, controls system 122 may include a plurality of control modules and each of the control modules may control a subsystem of the vehicle. For example, control system 122 may include an engine control module (ECM) to control engine operation, a transmission control module (TCM) to control transmission operation, and an integrated system controller (ISC) to control operation of the electric energy conversion and storage devices.

Figure 2:
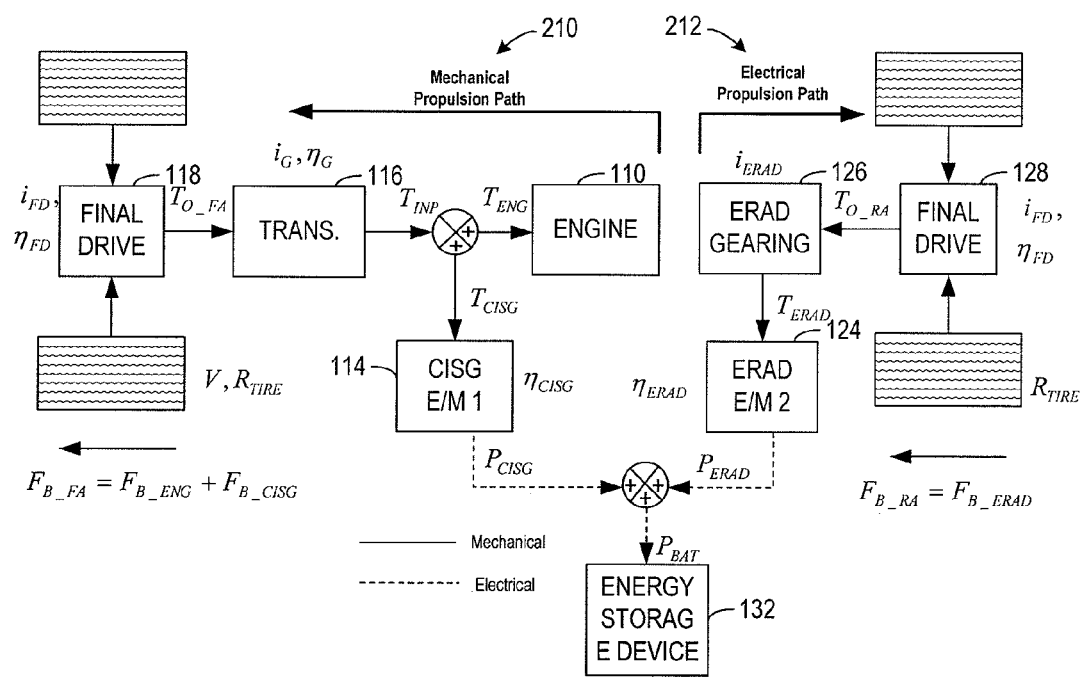
FIG. 2 shows an energy flow diagram of the propulsion system of FIG. 1.

FIG. 2 shows an example energy flow diagram corresponding to the hybrid propulsion system of FIG. 1. The energy flow diagram includes mechanical propulsion path 210 and electrical propulsion path 212. Mechanical propulsion path 210 may provide vehicle propulsion to front axle (or final drive) 118 and front wheels 120. In particular, engine 110 and/or CISG 114 may generate torque output that may be transmitted through transmission 116 to provide torque to front wheel 120 to propel vehicle (or propulsion system) 100. Further, during a deceleration condition, engine 110 and/or CISG 114 may be operated to generate negative torque transmitted through transmission 116 to front wheels 120 to provide engine braking capabilities to decelerate vehicle 100. In one example, during a deceleration condition, the control system may advantageously provide additional brake torque through the mechanical propulsion path by operating the CISG to maximize negative torque output within the operating limits of the CISG to generate electric energy that may be stored in the energy storage device to increase state of charge of the energy device which may be referred to as regenerative braking.

It will be appreciated that under some conditions, only the CISG may be operated to provide brake torque to decelerate the vehicle. In some cases, one or more cylinders of the engine may be deactivated during a deceleration condition. In this way, fuel economy performance of the engine may be improved. Further, under some conditions fuel and spark may be stopped in one or more cylinders of the engine and/or valve timing of the engine may be adjusted. In this way, pumping losses may be increased which may advantageously increase engine braking capabilities of the mechanical propulsion path.

Electrical propulsion path 212 may provide vehicle propulsion by providing torque directly to the rear axle (or final drive) 128 and rear wheels 130. In particular, ERAD 124 may generate torque output that may be transferred through ERAD gearing 126 and rear axle 128 to rear wheels 130 to propel vehicle 100. Further during a deceleration condition, ERAD 124 may be operated to generate negative torque transmitted through ERAD gearing 126 to rear wheels 130 to provide braking capabilities to decelerate vehicle 100. By controlling ERAD 124 to provide negative brake torque to rear wheels 130, electric energy may be produced that may be stored in the energy storage device so that the state of charge of the energy storage device may be increased.

Under some conditions, the CISG and the ERAD may be operated cooperatively to provide brake torque to the front wheels and the rear wheels, respectively without operation of the engine in order to maximize regeneration of the energy storage device. Further, under some condition the engine and the ERAD may be operated cooperatively to provide brake torque to the front wheels and the rear wheels, respectively. It will be appreciated that the transmission and/or the ERAD gearing may be controlled to meet requested brake torque demands. Control strategies for providing brake torque to decelerate the vehicle will be discussed in further detail below with reference to FIGS. 4-7.

During vehicle operation, the control system may direct torque output through the mechanical propulsion path 210 and/or electrical propulsion path 212 to operate vehicle 100 in different operating modes. For example, the control system may operate the vehicle in what may be referred to as electric drive in which only the ERAD may be controlled to provide motoring/generating capabilities (i.e. positive torque output and negative torque output, respectively).

As another example, the control system may operate the vehicle in what may be referred to as series hybrid drive in which the engine may be combusting air and fuel, the CISG may be operated to provide generating capabilities (e.g. negative torque, such as to increase the state of charge of the energy storage device), and the ERAD may be operated to provide motoring/generating capabilities depending on operating conditions.

As yet another example, the control system may operate the vehicle in what may be referred to as engine drive in which the engine is combusting fuel and spark, transmission is transmitting torque (i.e. engaged or slipping), and both the CISG and the ERAD are shut down. This mode of operation may be similar to operation of a non-hybrid vehicle that does not include electric energy conversion devices.

As yet another example, the control system may operate the vehicle in what may be referred to as parallel hybrid drive in which the engine is combusting air and fuel and the CISG and/or the ERAD are operational. Under some conditions, in parallel hybrid drive, the CISG may be shutdown and the ERAD may provide motoring/generating capabilities. Under some conditions, in parallel hybrid drive, the CISG may be providing motoring capabilities and the ERAD may be shut down. Under some conditions, in parallel hybrid drive, the CISG and the ERAD may provide motoring capabilities. Under some conditions, in parallel hybrid drive, the CISG may provide generating capabilities and the ERAD may provide motoring/generating capabilities or may be shutdown.

As yet another example, the control system may operate the vehicle in what may be referred to as engine start mode in which the CISIG may provide motoring capabilities to start the engine. In particular, the CISG may provide torque to the engine to facilitate engine cranking.

As yet another example, the control system may operate the vehicle in what may be referred to as engine stop mode in which engine cranking may be shut down.

It will be appreciated that the above engine operating modes are exemplary and other operating modes may be employed to control the vehicle during operation. In one example, a vehicle control strategy may include operating modes that may be performed during deceleration conditions to provide smooth engine braking capabilities during a transmission downshift event. An operating mode may be selected by the control system from a plurality of operating modes shown in greater detail in FIGS. 4A-4C. As one example, the operating modes may be selected by the control system in response to stored values. The control system may also utilize adaptive learning to select a suitable operating mode based on previous driveline braking or downshift response.

Figure 3:
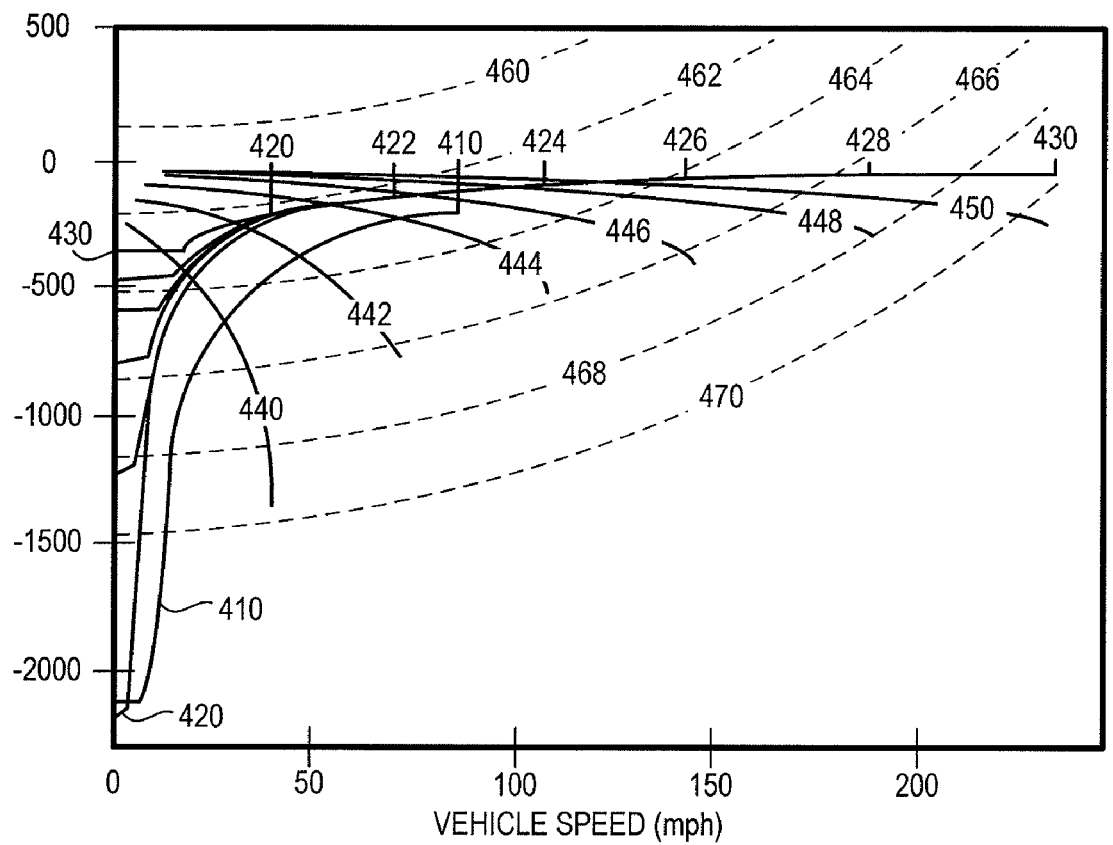
FIG. 3 is a graph illustrating maximum braking forces that may be achieved by the various components of an example hybrid propulsion system.

Note that the level of braking force provided by the CISG and the ERAD may be constrained by their respective limitations. Additionally, the energy storage capacity (e.g. battery state of charge (SOC)) and/or power exchange rate limitations of the energy storage device may further limit the level of braking force that may be provided by the CISG and ERAD. As one example, the driveline braking capabilities of both the CISG and ERAD may decrease with increasing vehicle speed as depicted by the graph of FIG. 3. Furthermore, the braking capabilities of the CISG and the engine may also vary as a function of the transmission state at a given vehicle speed since the engine speed will increase or decrease in response to transmission shifting.

FIG. 3 provides a graph depicting braking limitations of the ERAD, CISG, and engine with varying vehicle speeds and transmission states for hybrid propulsion system 100. In particular, an example of the maximum braking force that may be provided by the ERAD with varying vehicle speed is shown at 410. A range of maximum braking force that may be provided by the CISG is shown at 420-430 based on the particular transmission gear selected. For example, a maximum braking force that may be provided by the CISG when a first gear of the transmission is selected is shown at 420. Examples of the maximum braking force that may be provided by the CISG when one of a second, third, fourth, fifth, and sixth gear of the transmission is selected are shown at 422, 424, 426, 428, and 430, respectively. As depicted by the graph of FIG. 3, the maximum amount of braking force that may be provided by the CISG decreases with increasing vehicle speeds and is greater at lower gears than at higher gears.

FIG. 3 also shows a range of braking forces 440-450 that may be provided by the engine with varying vehicle speeds. For example, a maximum braking force that may be provided by the engine when a first gear of the transmission is selected is shown at 440. Examples of the maximum braking force that may be provided by the engine when one of a second, third, fourth, fifth, and sixth gear of the transmission is selected are shown at 442, 444, 446, 448, and 450, respectively. As depicted by the graph of FIG. 3, the amount of braking force that may be provided by the engine increases with increasing vehicle speeds and is greater at lower gears than at higher gears. Note that the selected transmission state (e.g. transmission gear and/or torque converter state) can take into account engine speed limits (e.g. lug and/or overspeed) in addition to friction element energy limitations at a given vehicle speed. Thus, the capabilities of the CISG and engine to provide driveline braking may be also constrained by the maximum and/or minimum allowable engine speeds.

FIG. 3 also depicts road load for varying road grades and changing vehicle speed. For example, a 0% grade is shown at 460, a −5% grade is shown at 462, a −10% grade is shown at 464, a −15% grade is shown at 466, a −20% grade is shown at 468, and a −25% grade is shown at 470. Note that a negative grade as described herein refers to a vehicle traveling down an inclined surface.

Thus, FIG. 3 illustrates example limitations of the engine, CISG, and ERAD of hybrid propulsion system 100 with varying vehicle speed and transmission state. Note that these limitations have been provided as an example and may vary with the particular driveline configuration and driveline actuators utilized by the control system. As shown in FIG. 3, during some conditions two or more of the engine, CISG and ERAD may be operated to provide the requested driveline braking force if the maximum braking force of any one of the driveline components is exceeded. Note that the friction brakes may also be used to reduce driveline braking in order to avoid limitations of the various driveline components. Thus, particular combinations of the engine, CISG, and ERAD, may be employed to perform engine braking, and more particularly smooth engine braking during an engine braking transmission downshift event. The combinations of torque sources are defined herein below by several different operating modes 1-3 which will be described in further detail with reference to FIG. 4. In particular, the operating modes may be specifically utilized to provide smoother wheel brake torque during engine braking transmission downshift events to provide improved vehicle drivability. The operating modes may be employed with or without requiring operation of the friction brakes to provide a requested brake torque. In this way, the limitations on the amount of driveline braking force provided by each of the engine, CISG, and ERAD may be taken into account when selecting a particular operating mode so that the requested driveline braking force may be achieved in an efficient manner.

Figure 4A:
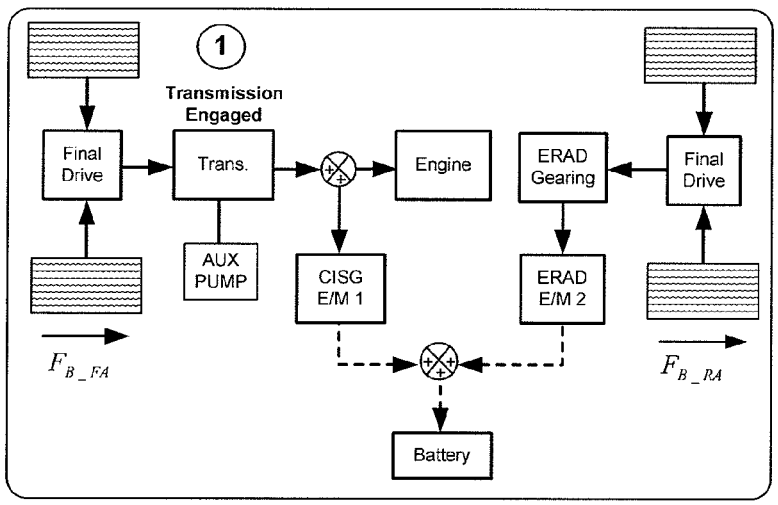
FIGS. 4A-4C show example operating modes of an example hybrid propulsion system and energy flow paths of the respective operating modes.
Figure 4B:
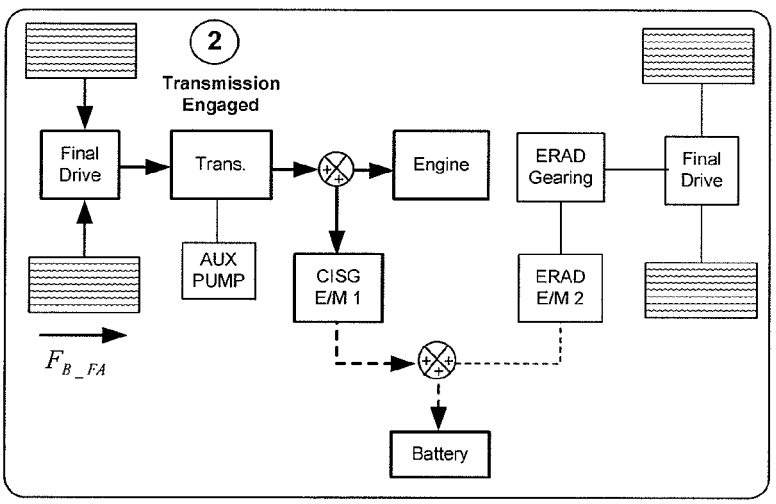
Figure 4C:
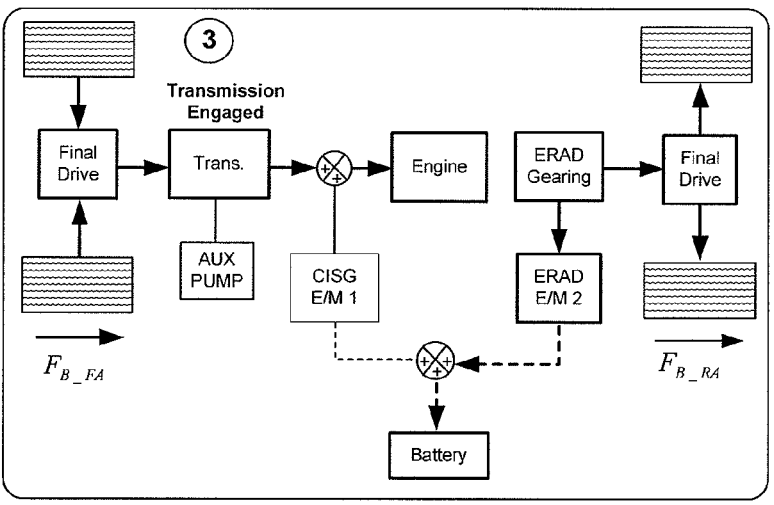

FIGS. 4A-4C show three different operating modes that may be performed to provide brake torque to the wheels during vehicle deceleration based on a transmission downshift event. The different operating modes may take into consideration operating conditions as well as operation limitations of the vehicle propulsion system components. Strategies for selecting an operating mode to provide brake torque during an engine braking transmission downshift event will be discussed in further detail below with reference to FIG. 7.

FIG. 4A shows a schematic depiction of hybrid propulsion system 100 performing a first operating mode that may be performed during an engine braking transmission downshift event. The first operating mode includes use of both the CISG and the ERAD to achieve the requested braking force during a transmission downshift event. In the first operating mode, both the CISG and the ERAD may absorb torque and convert the brake force into energy that may be stored by the energy storage device, as indicated by the bold lines and directional arrows. Since both the CISG and the ERAD convert brake force into energy which may be stored in the energy storage device, the first mode may provide the greatest energy storage device regenerative capabilities of the three operating modes. Accordingly, the first operating mode may be advantageously performed to improve energy recovery of the energy storage device. Furthermore, since both electric energy conversion devices are utilized to provide brake force in the first operating mode, the first operating mode may provide the greatest amount of brake force of the three operating modes. Accordingly, the first operating mode may be performed for engine braking downshift events involving lower gear ratios where the downshift creates greater torque spikes which may require a greater supplemental brake force to provide a smoother overall wheel braking force while meeting the brake demand. In one particular example, the first operating mode may be selected for an engine braking transmission downshift from a second gear ratio to a first gear ratio.

FIG. 4B shows a schematic depiction of hybrid propulsion system 100 performing a second operating mode that may be performed during an engine braking transmission downshift event. The second operating mode includes use of only the CISG to achieve the requested braking force during a transmission downshift event. In the second operating mode, the CISG may absorb torque and convert the brake force into energy that may be stored by the energy storage device, as indicated by the bold lines and directional arrows. The second operating mode may be advantageously performed to smooth torque output during a transmission downshift when the ERAD is not available to provide torque to smooth the transmission downshift. In one example, the ERAD may not be capable of providing torque during the transmission downshift due to system operating conditions exceeding the operating limits of the ERAD (e.g. overspeed limit, thermal limit). In another example, during a traction control event, the ERAD may be providing torque to control slippage of the rear wheels and thus may not be available to provide smoothing torque during the transmission downshift.

FIG. 4C shows a schematic depiction of hybrid propulsion system 100 performing a third operating mode that may be performed during an engine braking transmission downshift event. The third operating mode includes use of only the ERAD to achieve the requested braking force during a transmission downshift event. In the third operating mode, the ERAD may absorb torque and convert the brake force into energy that may be stored by the energy storage device, as indicated by the bold lines and directional arrows. Note that when performing the third operating mode, the engine will provide brake torque in cooperation with the ERAD to meet the requested brake force based on the magnitude of the requested brake force and operating conditions.

FIGS. 5A-5C graphically show one example of engine braking transmission downshift control using the ERAD. In this example, the above described third operating mode may be performed to smooth the wheel brake torque profile during transmission downshift events. FIG. 5A graphically shows vehicle speed during various engine braking transmission downshift events. The solid line represents vehicle speed without operation of the ERAD to smooth downshifting. Further, the dotted line represents vehicle speed with use of the ERAD to smooth downshifting. FIG. 5B graphically shows brake torque output during the various engine braking transmission downshift events. The solid line represents brake torque at the transmission output. The dotted and dashed line represents brake torque provided by the ERAD. The dotted line represents total brake torque output or brake torque at the wheels. FIG. 5C graphically shows transmission operation during the various engine braking transmission downshift events. The solid line represents the requested transmission gear ratio that may be provided at the transmission output. The dotted line represents the actual transmission ratio. In some cases, it may be desirable to delay downshifting in order to increase the regenerative braking capabilities of the electric energy conversion devices.

As shown at 502, a first transmission downshift event may be requested due to deceleration of the vehicle over time. The requested transmission downshift is from a fourth gear ratio to a third gear ratio. Prior to the downshift event the brake torque at the wheels and the transmission output may be declining due to vehicle deceleration. At 504, a transmission downshift event may be initiated, for example in order to prevent operating conditions from exceeding device operating limitations. Upon initiation of the transmission downshift event, the brake torque of the ERAD may be increased in anticipation of a brake torque spike that may be generated from the downshift. Although the brake torque at the transmission output may continue to decline until the actual transition to the lower gear, the brake torque at the wheels may be smoothly ramped up because of the increased ERAD brake torque. By ramping up the ERAD torque, the wheel output torque may be increased over a longer period of time which may be perceived as having a smoother feel as compared to the torque spike of an unassisted transmission downshift. Note that after the downshift the ERAD brake torque may be reduced or minimized in favor of using brake torque at the transmission output to continue decelerating the vehicle. As shown at 506, the speed of the vehicle decelerates at a lower rate due to the supplemental torque of the ERAD. By providing supplemental torque to the wheels during a transmission downshift event torque may be increased over a longer period of time and torque spikes at the wheels may be reduced. In this way, a smoother engine braking profile can be achieved resulting in improved vehicle operator comfort.

Figure 6:
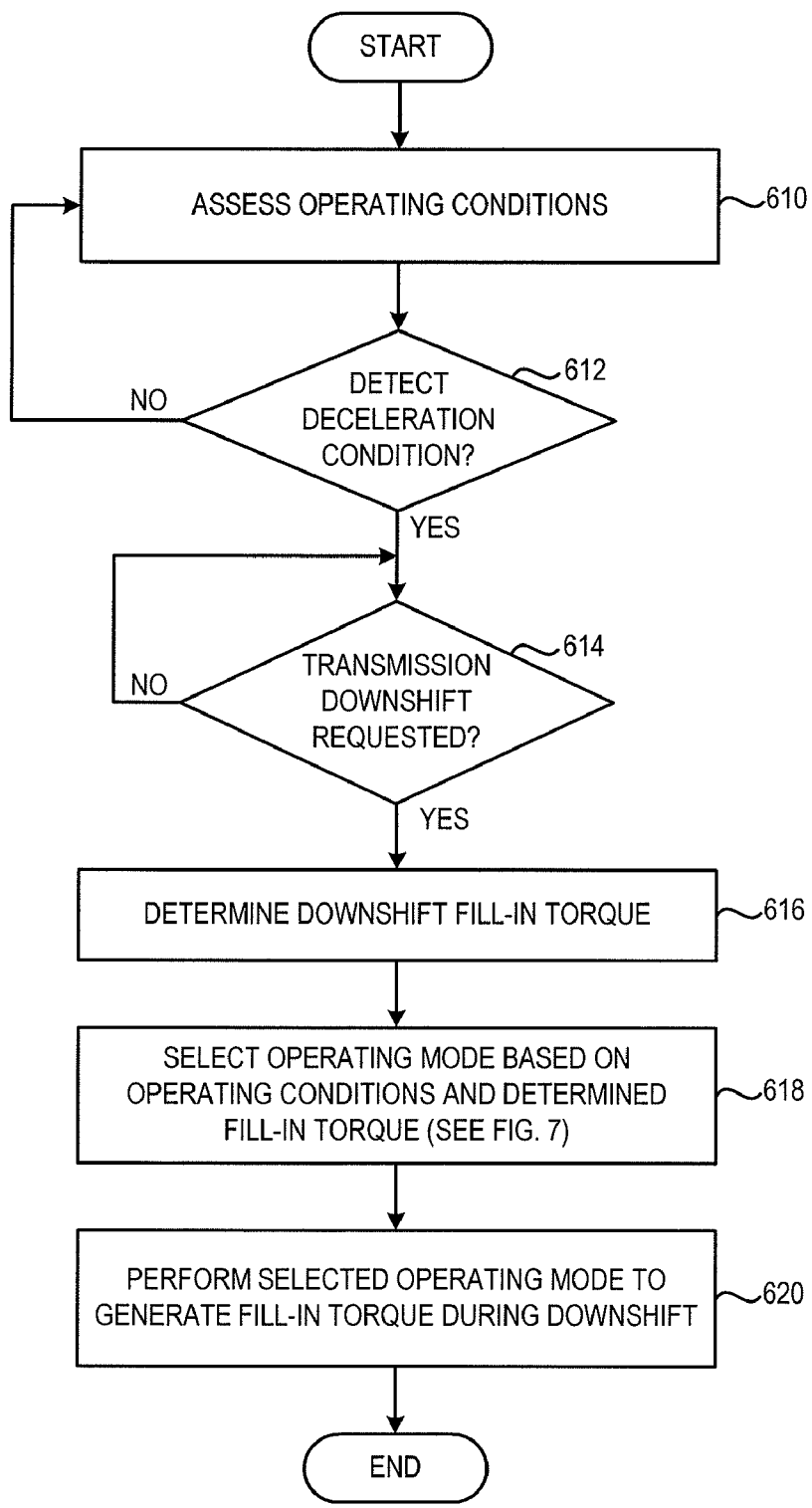
FIG. 6 shows a flowchart corresponding to a control routine for controlling torque output during an engine braking transmission downshift event.

FIG. 6 is a flow chart depicting an example control strategy for controlling driveline braking of hybrid propulsion system 100. In particular, the control strategy may be employed to provide brake torque to the vehicle wheels during an engine braking transmission downshift event to provide a smoother braking profile. At 610, the control system may assess operating conditions of the vehicle, including current, past, and/or predicted future operating conditions. As described herein, operating conditions may include, but are not limited to, one or more of the following: energy level or state of charge (SOC) of the energy storage device, energy exchange rate with the energy storage device, amount of torque exchanged between the drivelines and the ERAD and/or CISG, the position of a user input device such as brake pedal, ambient conditions such as air temperature and pressure, angle of inclination or grade of the road surface, transmission state including selected gear and/or torque converter state, transmission turbine and output speeds, engine speed, vehicle speed, among other operating states of the engine, CISG, ERAD, transmission, and energy storage device.

At 612, the control routine may include detecting a deceleration condition of the vehicle. A vehicle deceleration condition may be initiated by a user and/or by the control system. For example, where the user depresses a brake pedal or activates an input device for requesting a braking operation for the vehicle, the control system may receive the request from the user. As another example, the control system may request vehicle braking responsive to the operating conditions without receiving a braking request from the user. In other words, the control system may request vehicle braking, for example, during active cruise control, HDC, or other traction control operations. Thus, it should be appreciated that the braking request may originate from the user or from the control system. Furthermore, the braking request may include a request for a transmission downshift in order to increase the driveline braking force.

If 612 is NO (i.e. a vehicle deceleration condition is not detected), the routine may return to 610 where the operating conditions may be again assessed until a deceleration condition is detected. Alternatively, if 612 is YES (i.e. a vehicle deceleration condition is detected) the routine moves to 614.

At 614, the control routine may include determining if a transmission downshift is requested. If a transmission downshift is not requested, the routine may continue to poll until a transmission downshift is requested or until a deceleration condition is no longer detected. If a transmission downshift is requested the routine moves to 616 where a downshift fill-in torque may be determined. In one example, the downshift fill-in torque may be determined by subtracting the transmission output torque from the desired wheel torque to meet a requested engine brake force or rate of deceleration. As one example, the amount of braking force requested may be identified by the control system based on the operating conditions assessed at 610 and/or the position or movement of the brake pedal or shift selector by the user. The downshift fill-in torque may be provided by the ERAD and/or the CISG to supplement engine braking while the transmission shifts between gear ratios in order to reduce torque spikes.

Next at 618, a driveline operating mode may be selected based on the operating conditions assessed at 610 and the fill-in torque determined at 616. For a given requested braking force, or a requested negative driveline torque (fill-in torque), the control system may apply a rule-based state machine scheme in order to increase and/or maximize energy recovery while achieving the requested driveline braking force. The operating mode may be selected from the three operating modes described above with reference to FIGS. 4A-4C. An operating mode may be selected based on the magnitude of driveline braking force requested, current SOC conditions and/or power exchange limitations of the energy storage device, among other limitations of the driveline components. Operating mode selection strategies will be discussed in further detail below with reference to FIG. 7. As one example, the operating mode may be selected by the control system in response to stored values. The control system may also utilize adaptive learning to select a suitable braking mode based on previous driveline braking response.

Next at 620, the operating mode selected at 618 may be performed to provide brake torque at the vehicle wheels during an engine brake transmission downshift event. In this way, one or more sources of braking torque may be coordinated to smooth the engine braking profile during a transmission downshift event while providing increased energy recovery and considering the various limitations of the driveline components.

Figure 7:
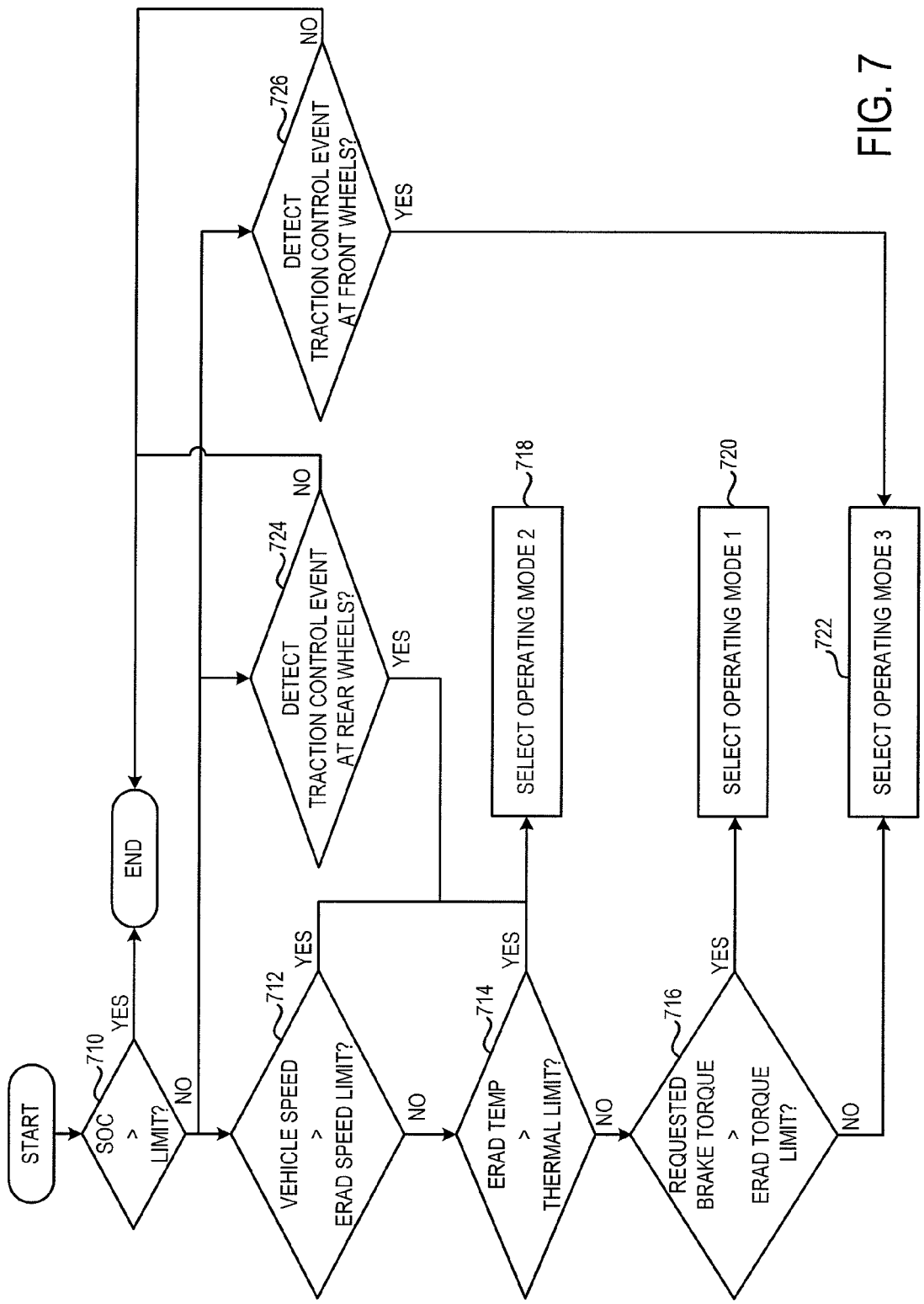
FIG. 7 shows a flowchart corresponding to a control routine for selecting an operating mode to control output torque during an engine braking transmission downshift event.

FIG. 7 shows a flow chart corresponding to an example control routine for selecting a suitable operating mode to provide fill-in brake torque to the wheels during an engine braking transmission downshift event. The example control routine may take into consideration the magnitude of driveline braking force requested, current SOC conditions and/or power exchange limitations of the energy storage device, among other limitations of the driveline components. At 710, the control routine may determine if a state of charge of the energy storage device is greater than a threshold limit. In one example, the threshold limit may be a maximum state of charge. In other words, since the energy storage device is substantially full of electric energy no more electric energy may be transferred to the energy storage device. Thus, regenerative braking may not be performed using the first electric energy conversion device and/or second electric energy conversion device. If the SOC is greater than the threshold limit, the control routine ends. Otherwise, if the SOC is less than the threshold limit than regenerative braking may be performed and the control routine may move to 712, 724, and 726.

At 712, the control routine may determine if a speed of the vehicle is greater than an operational speed limit of the ERAD. If the vehicle speed is greater than the operational speed limit of the ERAD the control routine moves to 718 where the second operating mode may be selected. In the second operating mode, the brake torque output of the CISG may be varied to meet the desired wheel torque and the ERAD may not provide torque output since the operating conditions fall outside the operational limits of the ERAD. In this way, torque output may be provided to the wheels during an engine braking transmission downshift event even when the ERAD is unavailable. Otherwise, if the vehicle speed is less than the operational speed limit of the ERAD the control routine moves to 714.

At 714, the control routine may determine if a temperature of the ERAD is greater than an operational temperature limit of the ERAD. If the ERAD temperature is greater than the operational temperature limit of the ERAD the control routine moves to 718 where the second operating mode may be selected. In the second operating mode, the brake torque output of the CISG may be varied to meet the desired wheel torque and the ERAD may not provide torque output since the operating conditions fall outside the operational limits of the ERAD. In this way, brake torque output may be provided to the wheels during an engine braking transmission downshift event to smooth the engine braking profile even when the ERAD is unavailable. Otherwise, if the ERAD temperature is less than the operational temperature limit of the ERAD the control routine moves to 716.

At 716, the control routine may determine if the requested brake torque is greater than a brake torque output limit of the ERAD. If the requested brake torque is greater than a brake torque output limit of the ERAD the control routine moves to 720 where the first operating mode may be selected. In the first operating mode, the brake torque output of both the CISG and the ERAD may be varied to meet the desired wheel torque. In this way, brake torque output may be provided to the wheels during an engine braking transmission downshift event to smooth the wheel braking force profile even when the a substantially large brake force beyond the capabilities of the ERAD is requested. Otherwise, if the requested brake torque is less than the brake torque output limit of the ERAD the control routine may move to 722 and the third operating mode may be selected. In the third operating mode, the brake torque output of the ERAD may be varied to meet the desired wheel torque and the CISG may not provide torque output. In this way, brake torque output may be provided to the wheels during an engine braking transmission downshift event to smooth the wheel braking force profile.

At 724, the control routine may determine if a traction control event is occurring at the rear wheels. In one example, the control routine may determine if the rear wheels of the vehicle are slipping. If the rear wheels are slipping due to the traction control event, torque transfer efficiency through the rear wheels may be reduced. Accordingly, the control routine may move to 718 and select the second mode of operation. By operating in the second mode and varying the brake torque output of the CISG, brake torque may be provided to the front wheels and away from the slippage. In this way, the brake torque profile may be smoothed during an engine braking transmission downshift event and traction control of the vehicle may be improved. If the control routine determines if a traction control event is not occurring at the rear wheels the control routine ends.

At 726, the control routine may determine if a traction control event is occurring at the front wheels. In one example, the control routine may determine if the front wheels of the vehicle are slipping. If the front wheels are slipping due to the traction control event, torque transfer efficiency through the front wheels may be reduced. Accordingly, the control routine may move to 722 and select the third mode of operation. By operating in the third mode and varying the brake torque output of the ERAD, brake torque may be provided to the rear wheels and away from the slippage. In this way, the brake torque profile may be smoothed during an engine braking transmission downshift event and traction control of the vehicle may be improved. If the control routine determines if a traction control event is not occurring at the front wheels the control routine ends.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system. It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hybrid propulsion system for a vehicle, comprising:
a multiple step fixed-gear ratio transmission device for transmitting torque to a first at least one drive wheel;
a first electric energy conversion device coupled to an input of the multiple step fixed-gear ratio transmission device; and
a control system, wherein during a deceleration condition, the control system increases negative torque output of the first electric energy conversion device to meet a desired wheel braking torque in response to the fixed-gear ratio transmission transitioning from a first gear ratio to a second gear ratio that is higher than the first gear ratio.

2. The hybrid propulsion system of claim 1, further comprising;
a second electric energy conversion device for transmitting torque to a second at least one drive wheel, wherein during a deceleration condition, the control system increases negative torque output of at least one of the first electric energy conversion device and the second electric energy conversion device to meet the desired wheel braking torque in response to the fixed-gear ratio transmission transitioning from the first gear ratio to the second gear ratio that is higher than the first gear ratio.

3. The hybrid propulsion system of claim 2, wherein the control system increases the negative torque output of the first electric energy conversion device and the second electric energy conversion device based on the desired wheel braking torque being greater than a maximum negative torque output of the second electric energy conversion device.

4. The hybrid propulsion system of claim 2, wherein the control system increases the negative torque output of the second electric energy conversion device based on the desired wheel braking torque being less than a maximum negative torque output of the second electric energy conversion device and at least one of a speed of the vehicle being less than an operational threshold speed of the second electric energy conversion device and a temperature of the second electric energy conversion device being less than an operational threshold temperature of the second electric energy conversion device.

5. The hybrid propulsion system of claim 2, wherein the control system only increases the negative torque output of the first electric energy device to meet the desired wheel braking torque based on at least one of a speed of the vehicle being greater than an operational threshold speed of the second electric energy device and a temperature of the second electric energy conversion device being greater than an operational threshold temperature of the second electric energy conversion device.

6. The hybrid propulsion system of claim 2, further comprising:
an energy storage device in electrical communication with the first electric energy conversion device and the second electric energy conversion device, and
wherein the control system does not increase the negative torque output of the at least one of the first electric energy conversion device and the second electric energy conversion device in response to the multiple step fixed-gear ratio transmission transitioning from the first gear ratio to the second gear ratio when a state of the energy storage device is greater than a threshold state of charge.

7. The hybrid propulsion system of claim 2, wherein the transition from the first gear ratio to the second gear ratio creates an increase in brake torque at an output of the multiple step fixed-gear ratio transmission and wherein the control system increases the negative torque output of the at least one of the first electric energy conversion device and the second electric energy conversion device during the transition, a magnitude of the increase of the negative torque output being proportional to a brake torque increase caused by the transition from the first gear ratio to the second gear ratio.

8. The hybrid propulsion system of claim 2, wherein the control system adjusts the negative torque output of the at least one of the first electric energy conversion device and the second electric energy conversion device to substantially no torque output responsive to the multiple step fixed-gear ratio transmission device being placed in the second gear ratio.

9. The hybrid propulsion system of claim 2, further comprising:
an internal combustion engine for transmitting torque to the first at least one drive wheel, and wherein the control system adjusts the internal combustion engine to pump air without spark or fuel to provide brake torque to meet the desired wheel braking torque in response to the multiple step fixed-gear ratio transmission transitioning from the first gear ratio to the second gear ratio that is higher than the first gear ratio.

10. A method of controlling a hybrid propulsion system for a vehicle including at least an internal combustion engine and a first electric energy conversion device for exchanging torque with a multiple step fixed-gear ratio transmission device, the fixed-gear ratio transmission device exchanging torque with a first set of drive wheels, the hybrid propulsion system having a second electric energy conversion device for exchanging torque with a second set of drive wheels, the method comprising:
during an engine braking deceleration condition, receiving a requested wheel brake torque;
adjusting a gear ratio state of the fixed-gear ratio transmission device to increase a level of braking force provided to the first set of drive wheels of the vehicle in response to receiving the requested wheel brake torque;
varying a level of torque exchanged between the first electric energy conversion device and the first set of drive wheels responsive to adjusting the gear ratio state of the fixed-gear ratio transmission device and based on a traction control event of the second set of drive wheels; and
varying a level of torque exchanged between the second electric energy conversion device and the second set of drive wheels responsive to adjusting the gear ratio state of the fixed-gear transmission device and based on a traction control event of the first set of drive wheels.

11. The method of claim 10, wherein the traction control event is slippage of the wheels.

12. The method of claim 10, further comprising:
varying a level of torque exchanged between both the first electric energy conversion device and the first set of drive wheels and the second electric energy conversion device and the second set of drive wheels based on no slippage of the first set of drive wheels and the second set of drive wheels and the requested wheel brake torque being greater than a torque output limit of the second electric energy conversion device.

13. The method of claim 10, further comprising:
adjusting the gear ratio state of the fixed-gear ratio transmission device responsive to a relative level of electrical energy generated by a first motor and a second motor.

14. The method of claim 10, wherein varying a level of torque is increasing brake torque.

15. A hybrid propulsion system for a vehicle, comprising:
- a multiple step fixed-gear ratio transmission device for transmitting torque to a first at least one drive wheel;
- a first electric energy conversion device coupled to an input of the fixed-gear ratio transmission device;
- a second electric energy conversion device for transmitting torque to a second at least one drive wheel;
- a control system configured to provide torque output to meet a desired wheel braking torque in response to the multiple step fixed-gear ratio transmission transitioning from a first gear ratio to a second gear ratio that is higher than the first gear ratio, the control system configured to perform a first mode to provide torque output to meet the desired wheel braking torque, wherein braking torque is provided by the first electric energy conversion device and the second electric energy conversion device does not provide braking torque, the control system configured to perform a second mode to provide torque output to meet the desired wheel braking torque, wherein braking torque is provided by the second electric energy conversion device and the first electric energy conversion device does not provide braking torque, and the control system configured to perform a third mode to provide torque output to meet the desired wheel braking torque, wherein braking torque is provided by the first electric energy conversion device and the second electric energy conversion device.

16. The hybrid propulsion system of claim 15, wherein the control system is configured to operate in the first mode to provide torque output to meet the desired wheel braking torque based on a vehicle speed being greater than a threshold speed limit of the second electric energy conversion device and an operating temperature of the second electric energy conversion device being greater than a temperature threshold limit of the second electric energy conversion device.

17. The hybrid propulsion system of claim 15, wherein the control system is configured to operate in the first mode to provide torque output to meet the desired wheel braking torque based on slippage of the second at least one drive wheel.

18. The hybrid propulsion system of claim 15, wherein the control system is configured to operate in the second mode to provide torque output to meet the desired wheel braking torque based on a vehicle speed being less than a threshold speed limit of the second electric energy conversion device and an operating temperature of the second electric energy conversion device being less than a temperature threshold limit of the second electric energy conversion device.

19. The hybrid propulsion system of claim 15, wherein the control system is configured to operate in the second mode to provide torque output to meet the desired wheel braking torque based on slippage of the first at least one drive wheel.

20. The hybrid propulsion system of claim 15, wherein the control system is configured to operate in the third mode to provide torque output to meet the desired wheel braking torque based on a vehicle speed being less than a threshold speed limit of the second electric energy conversion device, an operating temperature of the second electric energy conversion device being less than a temperature threshold limit of the second electric energy conversion device, and the desired wheel braking torque being greater than a maximum torque output of the second electric energy conversion device.

21. The hybrid propulsion system of claim 15, further comprising:
- an energy storage device in electrical communication with the first electric energy conversion device and the second electric energy conversion device, wherein the control system is further configured to operate in a fourth mode where no torque output is provided by the first electric energy conversion device and the second electric energy conversion device, and the control system operates in the fourth mode when a state of charge of the energy storage device is above a threshold energy storage limit.

* * * * *